US012523480B2

(12) United States Patent
Zhang et al.

(10) Patent No.: US 12,523,480 B2
(45) Date of Patent: Jan. 13, 2026

(54) USING A MACHINE-TRAINED MODEL THAT PROVIDES AN ESTIMATED TIME-OF-ARRIVAL AND DISTRIBUTION PARAMETERS

(71) Applicant: Microsoft Technology Licensing, LLC, Redmond, WA (US)

(72) Inventors: Chiqun Zhang, Sunnyvale, CA (US); Dragomir Dimitrov Yankov, Palo Alto, CA (US); Michael Robert Evans, Seattle, WA (US); Antonios Karatzoglou, San Francisco, CA (US); Florin Sabau, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 240 days.

(21) Appl. No.: 18/206,581

(22) Filed: Jun. 6, 2023

(65) Prior Publication Data
US 2024/0410706 A1    Dec. 12, 2024

(51) Int. Cl.
*G01C 21/34* (2006.01)
*G06N 3/0499* (2023.01)

(52) U.S. Cl.
CPC ....... *G01C 21/3453* (2013.01); *G06N 3/0499* (2023.01)

(58) Field of Classification Search
None
See application file for complete search history.

(56) References Cited

U.S. PATENT DOCUMENTS

| | | | |
|---|---|---|---|
| 10,127,496 B1* | 11/2018 | Fu ....................... | G01C 21/3407 |
| 2007/0010941 A1* | 1/2007 | Marsh .............. | G08G 1/096861 |
| | | | 701/533 |
| 2011/0208417 A1* | 8/2011 | Fink ................. | G08G 1/096827 |
| | | | 701/532 |
| 2015/0073689 A1* | 3/2015 | Hampapur ........... | G08G 1/0145 |
| | | | 701/118 |

(Continued)

FOREIGN PATENT DOCUMENTS

JP    2009210532 A    *   9/2009

OTHER PUBLICATIONS

Machine translation of JP-2009210532-A (Year: 2009).*

(Continued)

*Primary Examiner* — Anne Marie Antonucci
*Assistant Examiner* — Kyle S Park

(57) ABSTRACT

A technique generates estimated time-of-arrival (ETA) information to assist in navigating from one physical location to another. The technique uses a computer-implemented route-finding engine to identify a route between a specified starting location and an ending location of a trip. The route includes a sequence of segments. The technique then uses a machine-trained model to map information regarding the segments to ETA information. The ETA information provides an estimate of a time-of-arrival for the trip as a whole. The ETA information also provides an estimate of parameters that describe the level of confidence of the time-of-arrival estimate for the trip. A training system produces the machine-trained model using a loss function, part of which models the time-of-arrival for the trip as a mixture of distributions.

20 Claims, 9 Drawing Sheets

(56) References Cited

U.S. PATENT DOCUMENTS

| | | | |
|---|---|---|---|
| 2017/0059331 A1* | 3/2017 | Ni | G06Q 10/04 |
| 2021/0366144 A1* | 11/2021 | Magistri | G06V 20/56 |
| 2022/0018674 A1* | 1/2022 | Xu | G06Q 10/08355 |
| 2022/0157167 A1* | 5/2022 | Gupta | G01C 21/3446 |

OTHER PUBLICATIONS

Chen, et al., "Analyzing travel time distribution based on different travel time reliability patterns using probe vehicle data," in International Journal of Transportation Science and Technology, Vo. 9, Issue 1, Mar. 2020, pp. 64-75.

Delling, et al., "Customizable Route Planning," in Proceedings of the 10th International Symposium on Experimental Algorithms, (SEA'11), May 2011, 12 pages.

Hu, et al., "DeeprETA: An ETA Post-processing System at Scale," arXiv, Cornel University, arXiv:2206.02127v1 [cs.LG], Jun. 5, 2022, 9 pages.

"Kolmogorov-Smirnov test," available at https://en.wikipedia.org/wiki/Kolmogorov-Smirnov_test, Wikipedia article, accessed on May 12, 2023, 10 pages.

Newson, et al., "Hidden Markov Map Matching Through Noise and Sparseness," in GIS '09: Proceedings of the 17th ACM SIGSPATIAL International Conference on Advances in Geographic Information Systems, Nov. 2009, pp. 336-343.

Sun, et al., "FMA-ETA: Estimating Travel Time Entirely Based on FFN with Attention," in Proceedings of IEEE International Conference on Acoustics, Speech and Signal Processing, Jun. 2021, pp. 3355-3359.

Wang, et al., "Application of Bootstrap Method in Kolmogorov-Smirnov Test," in 2011 International Conference on Quality, Reliability, Risk, Maintenance, and Safety Engineering, 2011, 5 pages.

Wang, et al., "Learning to Estimate the Travel Time," in KDD '18: Proceedings of the 24th ACM SIGKDD International Conference on Knowledge Discovery & Data Mining, Jul. 2018, pp. 858-866.

Yan, et al., "Efficiency of ETA Prediction," arXiv, Cornell University, arXiv:2112.09993v2 [stat.AP], Feb. 1, 2023, 68 pages.

"Viterbi algorithm," available at https://en.wikipedia.org/wiki/Viterbi_algorithm, Wikipedia article, accessed on May 23, 2023, 9 pages.

"Pathfinding," available at https://en.wikipedia.org/wiki/Pathfinding, Wikipedia article, accessed on May 15, 2023, 6 pages.

"Kernel density estimation," available at https://en.wikipedia.org/wiki/Kernel_density_estimation, Wikipedia article, accessed on May 19, 2023, 11 pages.

"A* search algorithm," available at https://en.wikipedia.org/wiki/A*_search_algorithm, Wikipedia article, accessed on May 23, 2023, 12 pages.

"Calculate a Route," available at https://learn.microsoft.com/en-us/bingmaps/rest-services/routes/calculate-a-route, Microsoft Documentation, Microsoft Corporation, Redmond, WA, Jul. 20, 2022, 8 pages.

Vaswani, et al., "Attention Is All You Need," in 31st Conference on Neural Information Processing Systems (NIPS 2017), 2017, 11 pages.

"Multivariate normal distribution," available at https://en.wikipedia.org/wiki/Multivariate_normal_distribution, Wikipedia article, accessed on Jun. 1, 2023, 15 pages.

"Log-t distribution," available at https://en.wikipedia.org/wiki/Log-t_distribution, Wikipedia article, accessed on Jun. 1, 2023, 3 pages.

"Gamma distribution," available at https://en.wikipedia.org/wiki/Gamma_distribution, Wikipedia article, accessed on Jun. 1, 2023, 21 pages.

Massey, Frank J., "The Kolmogorov-Smirnov Test for Goodness of Fit," in Journal of the American Statistical Association, vol. 46, Issue 253, Mar. 1, 1951, pp. 68-78.

Holm, et al., "Utilizing Mixture Density Networks for Travel Time Probability Distribution Predictions," available at https://vbn.aau.dk/ws/files/335183806/SW_10_another_one.pdf, Department of Computer Science, Aalborg University, Denmark, Jun. 12, 2020, 21 pages.

Jabari, et al., "Sparse Travel Time Estimation from Streaming Data," arXiv, arXiv:1804.08130v1 [stat.ML], Apr. 22, 2018, 33 pages.

Jabari, et al., "Sparse Travel Time Estimation from Streaming Data," arXiv:1804.08130v3 [stat. ML], Jan. 4, 2019, 39 pages.

Veres, et al., "Deep Learning for Intelligent Transportation Systems: A Survey of Emerging Trends," in IEEE Transactions on Intelligent Transportation Systems, vol. 21, No. 8, Jul. 24, 2019, pp. 3152-3168.

PCT Search Report and Written Opinion for PCT/US2024/030686, mailed on Sep. 23, 2024, 14 pages.

Zhang, et al., "A Post-routing ETA Model Providing Confidence Feedback," in SIGSPATIAL '23: Proceedings of the 31st ACM International Conference on Advances in Geographic Information Systems, Nov. 2023, Article No. 63, pp. 1-4.

* cited by examiner

OVERVIEW OF OPERATION OF THE TRAVEL ASSISTANCE SYSTEM, 602

RECEIVE A STARTING LOCATION CORRESPONDING TO A PHYSICAL LOCATION AT WHICH A TRIP IS TO BEGIN, AND AN ENDING LOCATION CORRESPONDING TO A PHYSICAL LOCATION AT WHICH THE TRIP IS TO END.
604

USE A COMPUTER-IMPLEMENTED ROUTE-FINDING TECHNIQUE TO IDENTIFY A ROUTE BETWEEN THE STARTING LOCATION AND THE ENDING LOCATION, THE ROUTE INCLUDING A SEQUENCE OF SEGMENTS, THE SEGMENTS CORRESPONDING TO RESPECTIVE SECTIONS OF PHYSICAL ROADWAY INFRASTRUCTURE.
606

USE A MACHINE-TRAINED MODEL TO MAP INFORMATION REGARDING THE SEGMENTS TO TIME-OF-ARRIVAL (ETA) INFORMATION, THE MACHINE-TRAINED MODEL CORRESPONDING TO A NEURAL NETWORK THAT IS TRAINED BASED ON A LOSS FUNCTION THAT MODELS THE ETA INFORMATION USING A MIXTURE OF TWO OR MORE DISTRIBUTIONS.
608

USE THE TIME-OF-ARRIVAL AS GUIDANCE IN NAVIGATING BETWEEN THE STARTING LOCATION AND THE ENDING LOCATION VIA THE ROUTE.
610

FIG. 6

DISTRIBUTION EXPLORATION SYSTEM 114
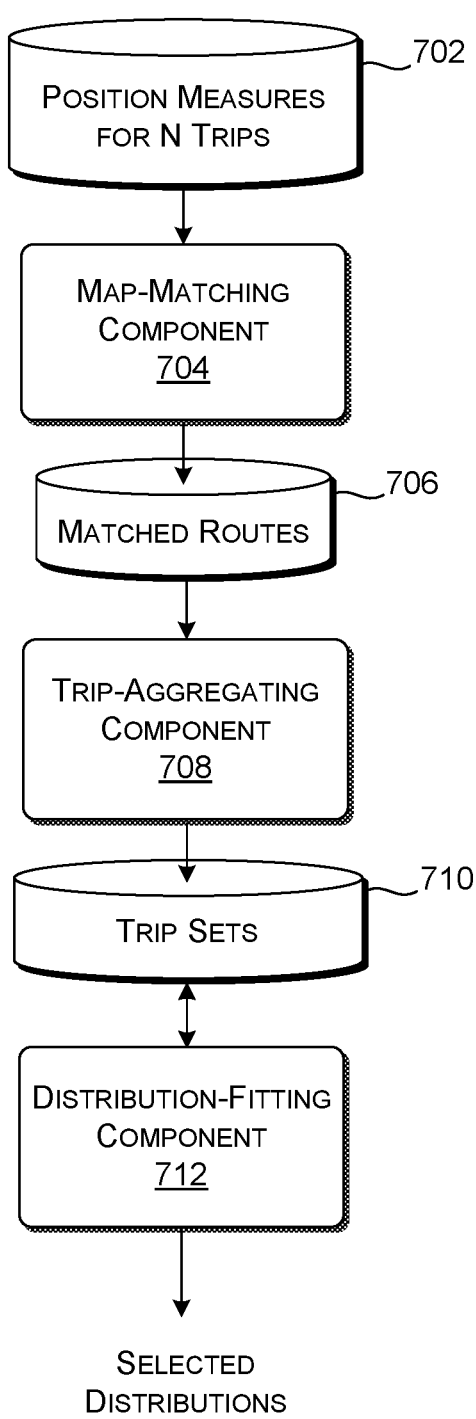
FIG. 7
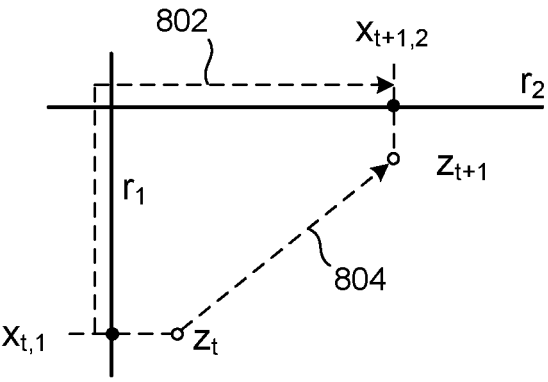
FIG. 8
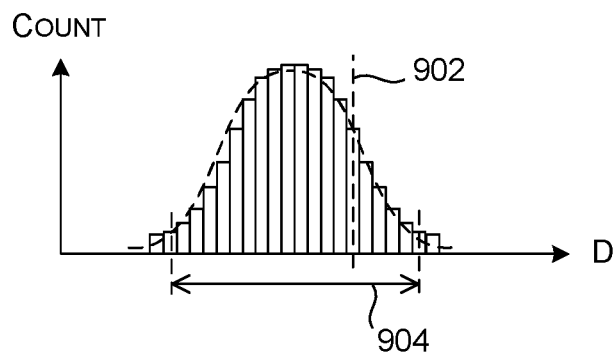
FIG. 9
| MIXTURE | NORMAL | LOGNORMAL |
|---------|--------|-----------|
| 1 | 61% | 90% |
| 2 | 92% | 91% |
| 3 | 93% | 98% |
FIG. 10

USING A MACHINE-TRAINED MODEL THAT PROVIDES AN ESTIMATED TIME-OF-ARRIVAL AND DISTRIBUTION PARAMETERS

BACKGROUND

Routing engines commonly generate a candidate route and a single-value estimate of how long a vehicle will take to traverse the route. This value is commonly referred to as an estimated time-of-arrival (ETA). Routing engines, however, sometimes generate unreliable ETA information. For instance, in some cases, routing engines are subject to inaccuracies caused by accumulated errors. Alternatively, or in addition, routing engines may generate unreliable results due to noisy traffic data. To address this problem, some trip-planning systems use a post-processing module that is designed to provide a more reliable time-of-arrival estimate for a trip. In this type of trip-planning system, the routing engine generates a candidate route, and the post-processing module provides a value that specifies the time required to traverse the route.

Mapping systems may nevertheless generate unreliable ETA values even with the inclusion of a post-processing module. A person who relies on such ETA information risks arriving too early or late at a target destination. This problem generally results in inefficient navigation over physical space.

SUMMARY

A technique is described herein for generating estimated time-of-arrival (ETA) information to assist in navigating from one physical location to another. In some implementations, the technique uses a computer-implemented route-finding engine to identify a route between a specified starting location and an ending location of a trip. The route includes a sequence of route segments. The technique then uses a machine-trained model to map information regarding the route segments to ETA information. The machine-trained model corresponds to a neural network that is trained based on a loss function that models the ETA information using, in part, a mixture of two or more distributions (also referred to herein as a mixture distribution). For example, the mixture of distributions corresponds to a mixture of normal distributions or a mixture of lognormal distributions.

According to other illustrative aspects, the ETA information produced by the machine-trained model has plural parts. One part provides an estimate of a time-of-arrival for the trip as a whole. Another part provides an estimate of parameters that describe the two or more distributions. For example, the parameters provide the mean and standard deviation of each distribution in the mixture distribution.

According to other illustrative aspects, the machine-trained model operates by: providing input information that describes distances and features associated with the sequence of segments in the route; mapping the input information to a plurality of segment embeddings using attention logic; and mapping the segment embeddings and a set of trip features to the ETA information.

Overall, the technique allows a user to efficiently navigate between physical locations. That is, the technique provides sufficient information that enables a user to select appropriate departure times. Alternatively, or in addition, a navigation control system, a dispatch system, or any other downstream system leverages the ETA information to perform its respective functions in a more efficient manner.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 6 shows a process that represents one manner of operation of the travel assistance system of FIG. 1.

FIG. 7 shows one implementation of a distribution exploration system, which is another part of the computing system of FIG. 1.

FIG. 8 shows an example that explains one way in which the distribution exploration system of FIG. 7 performs a map-matching operation.

FIG. 9 shows an example that explains one way in which the distribution exploration system of FIG. 7 performs a distribution-fitting operation.

FIG. 10 shows an example of distribution-fitting results produced by the distribution exploration system of FIG. 8.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

A. Overview of the Computing System

Figure 1:
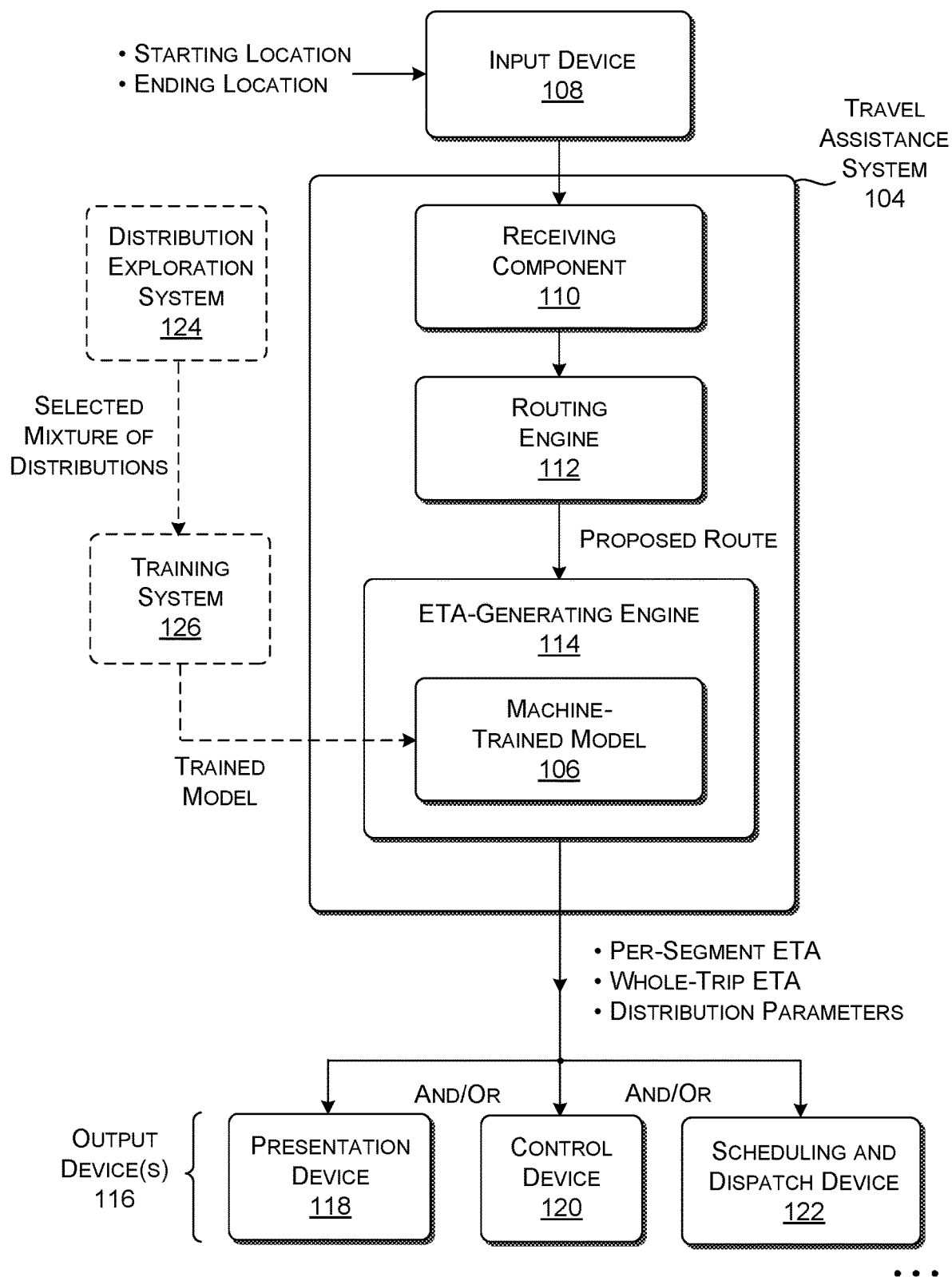
FIG. 1 shows a computing system having a travel assistance system for generating a route and generating estimated time-of-arrival (ETA) information.

FIG. 1 shows a computing system 102 having a travel assistance system 104 for generating a route and generating estimated time-of-arrival (ETA) information for the route. As will be described, the ETA information has plural parts. A first part provides an estimate of the amount of time required to traverse each segment of a route, in other words, per-segment traversal time. A second part provides an estimate of a time-of-arrival for a trip as a whole. A third part provides an estimate of parameters that describe the level of confidence of the trip time-of-arrival. The travel assistance system 104 uses a machine-trained model 106 to produce these three parts. The machine-trained model 106 is trained using a loss function, a part of which models the ETA information as a mixture of distributions.

Figure 13:
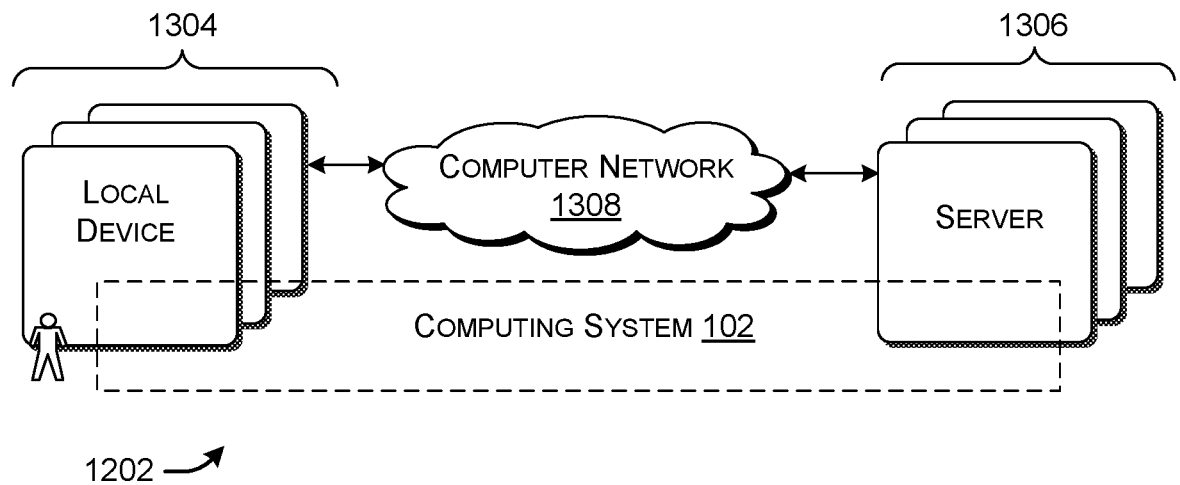
FIG. 13 shows computing equipment that, in some implementations, is used to implement the computing system of FIG. 1.
Figure 14:
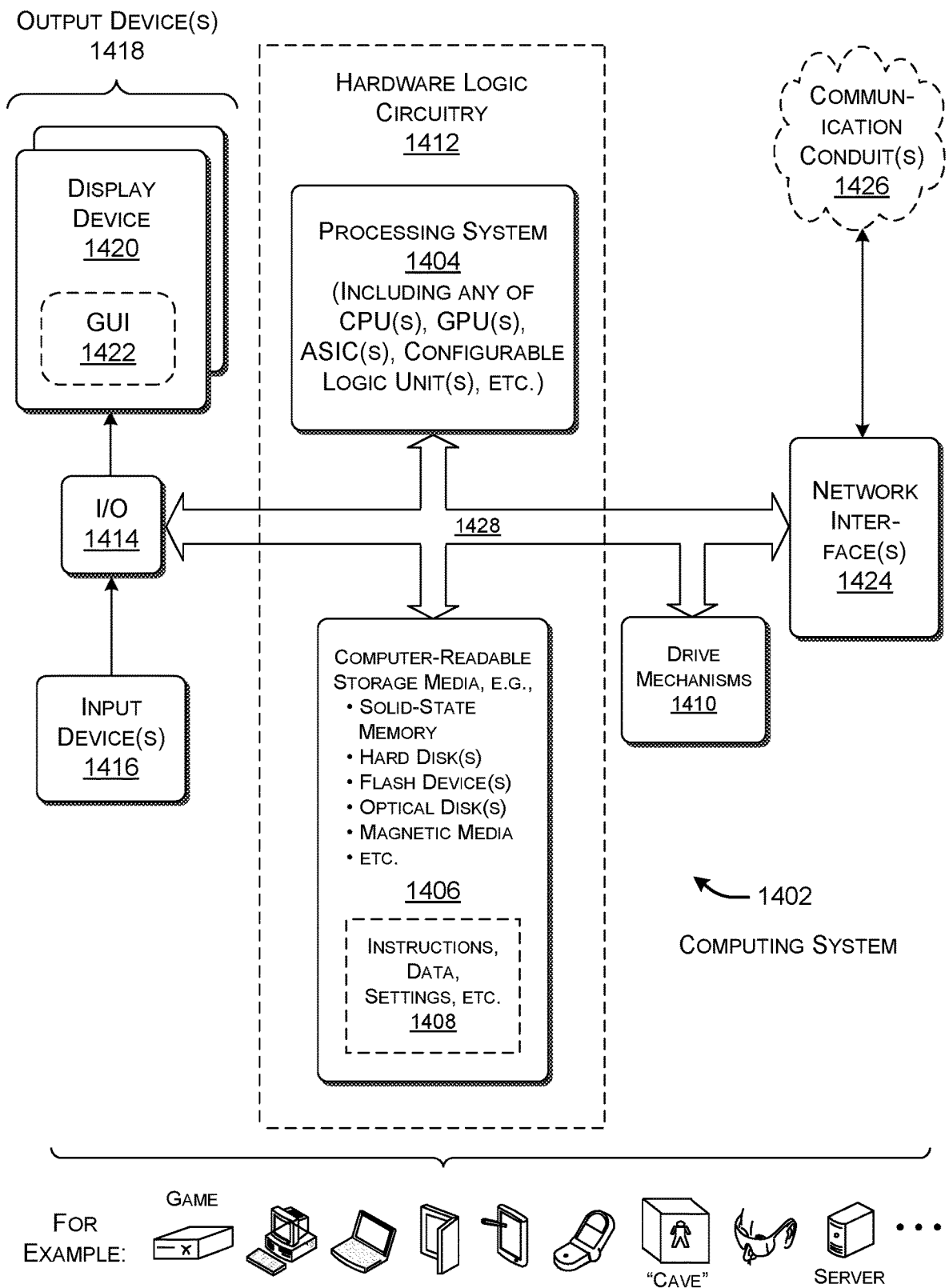
FIG. 14 shows an illustrative type of computing system that, in some implementations, is used to implement any aspect of the features shown in the foregoing drawings.

By way of terminology, as used herein, a "machine-trained model" refers to computer-implemented logic for executing a task using machine-trained weights that are produced in a training operation. A "weight" refers to any type of parameter value that is iteratively produced by the training operation. In some contexts, terms such as "component," "module," "engine," and "tool" refer to parts of computer-based technology that perform respective functions. FIGS. 13 and 14, described below, provide examples of illustrative computing equipment for performing these functions.

An input device 108 provides input information to the travel assistance system 104. In some implementations, the input information specifies a desired starting location and an ending location of a trip, and optionally a desired time of departure. A user can enter location information in any manner, such as by specifying address information or position information. Alternatively, or in addition, the input device 108 serves as an interface by which a position-determining device (not shown) provides real-time information regarding a current position of the user, or the current position of the user's vehicle. In some implementations, for instance, the position-determining device is a Global Positioning System (GPS) device installed in the user's vehicle, which measures the current position of the user's vehicle on a periodic basis. The travel assistance system 104 leverages the current position to update the estimated amount of time that is required to reach a specified ending location.

In some implementations, the input device 108 is any type of device by which the user enters alphanumeric information, such as a key input device or any type of a touch input device. In other cases, the input device 108 is a microphone in conjunction with a speech recognition system. In some cases, the input device 108 is co-located with the travel assistance system 104. In other cases, the input device 108 is provided at a first location and the travel assistance system 104 is located at a second location. A computer network (not shown) separates the computing equipment at these two locations.

The travel assistance system 104 includes a receiving component 110 for receiving the input information. A routing engine 112 uses any type of routing algorithm to identify a suitable route for traveling between the starting location and the ending location. Examples of routing algorithms include the Dijkstra's algorithm, the A* algorithm, the Customizable Route Planning (CRP) algorithm (described, for instance, in DELLING, et al., "Customizable Route Planning," in Proceedings of the 10th International Symposium on Experimental Algorithms, (SEA'11), May 2011, 12 pages), and so on. This is a non-exhaustive list; other implementations use yet other types of routing engines. One commercially available routing engine is provided by BING MAPS, provided by Microsoft Corporation of Redmond, Washington. BING MAPS provides an Application Programming Interface (API) by which entities can interact with its routing functionality.

Consider the A* algorithm. This algorithm partitions a search space into a plurality of cells. Assume that the algorithm is currently processing a particular cell in the plurality of cells, referred to as the "current cell." The algorithm advances to the adjacent cell that has the lowest F score, and which is designated as "open." The F score is defined by the summation of a G score and an H score. The G score reflects a distance of a cell under consideration with respect to a starting cell. The H score reflects a distance of the cell under consideration to an ending cell. Upon advancing to a next cell, the algorithm marks the next cell as the current cell, and changes it status to "closed." The algorithm advances from cell to cell in this manner until it reaches the ending cell, or until it determines that the ending cell is not reachable.

The routing engine 112 outputs a candidate route. The candidate route is made up of a plurality of route segments (just "segments" hereinafter). The segments correspond to respective sections of a roadway infrastructure that collectively connect the starting location to the ending location. The routing engine 112 also can produce an estimated time-of-arrival. The routing engine 112 performs this task by estimating the time that is required to traverse each segment, and then summing the traversal times for all of the segments that compose the route.

An ETA-generating engine 114 re-estimates the time-of-arrival, generally in a more accurate manner than the routing engine 112. More specifically, the ETA-generating engine 114 uses the machine-trained model 106 to map information regarding the candidate route to the above-summarized three-part ETA information. In some implementations, the three-part ETA information produced by the ETA-generating engine 114 replaces the ETA value produced by the routing engine 112. That is, the ETA-generating engine 114 presents the machine-trained model's ETA information, rather than the routing engine's ETA information. Although FIG. 1 shows an integral travel assistance system 104 that includes the routing engine 112 and the ETA-generating engine 114, note that the ETA-generating engine 114 is route-engine-agnostic, which means that it can be combined with any routing engine 112. Further, the providers of the routine engine 112 and the ETA-generating engine 114 may be the same or different entities.

One of more output devices 116 use the ETA information provided by the ETA-generating engine 114. For instance, a presentation device 118 presents the ETA information on a display device and/or presents the ETA information in audio form via a speaker. A user may use the ETA information to determine an appropriate time at which to begin a trip.

A control device 120 uses the ETA information to govern any type of automated process. For example, the control device 120 uses the ETA information to control the speed and/or steering of a vehicle (corresponding to a self-driving vehicle or a human-operated vehicle). For instance, consider the case in which the ETA information reveals that the user is behind schedule in reaching a target destination. The control device 120 responds to this state by increasing the speed of the vehicle and/or choosing an alternative route to the target destination.

In another case, the control device 120 controls any other system that is impacted by the user's travel plans (that is, besides the vehicle that is used to make the trip). For instance, assume that the ending location corresponds to the user's home or office. The control device 120 adjusts the environmental conditions of the user's home or office based on the ETA information, e.g., by turning on an air conditioning system 15 minutes in advance of the user's expected arrival at the target destination.

A scheduling and dispatch device 122 uses the ETA information to schedule when a vehicle in a fleet of vehicles should depart to a target destination. The scheduling and dispatch device 122 then sends instructions to the driver of the vehicle that conveys the departure time and other details of a trip. These uses are described here by way of example; other implementations leverage the ETA information for other purposes.

A distribution exploration system 124 assists a developer in selecting the type (or types) of distributions that will be used to train the machine-trained model 106. A training system 126 performs the task of actually training the machine-trained model 106.

The travel assistance system 104 allows a user to more efficiently reach a target destination. The travel assistance system 104 specifically decreases the probability that the user will arrive too early or late to a particular event. Further note that the travel assistance system 104 generates ETA information in a manner that is sensitive to the user's specified time of departure and/or other environment variables.

The travel assistance system 104 also increases the efficiency of the control device 120 and the scheduling and dispatch device 122. For example, with respect to the scheduling and dispatch device 122, the ETA information reduces the possibility that a vehicle will arrive at a target destination too early or late. A vehicle that arrives too early is left idle and unproductive. A vehicle that arrives too late can cause delays to other downstream tasks that depend on the timely arrival of the vehicle and its payload.

Figure 2:
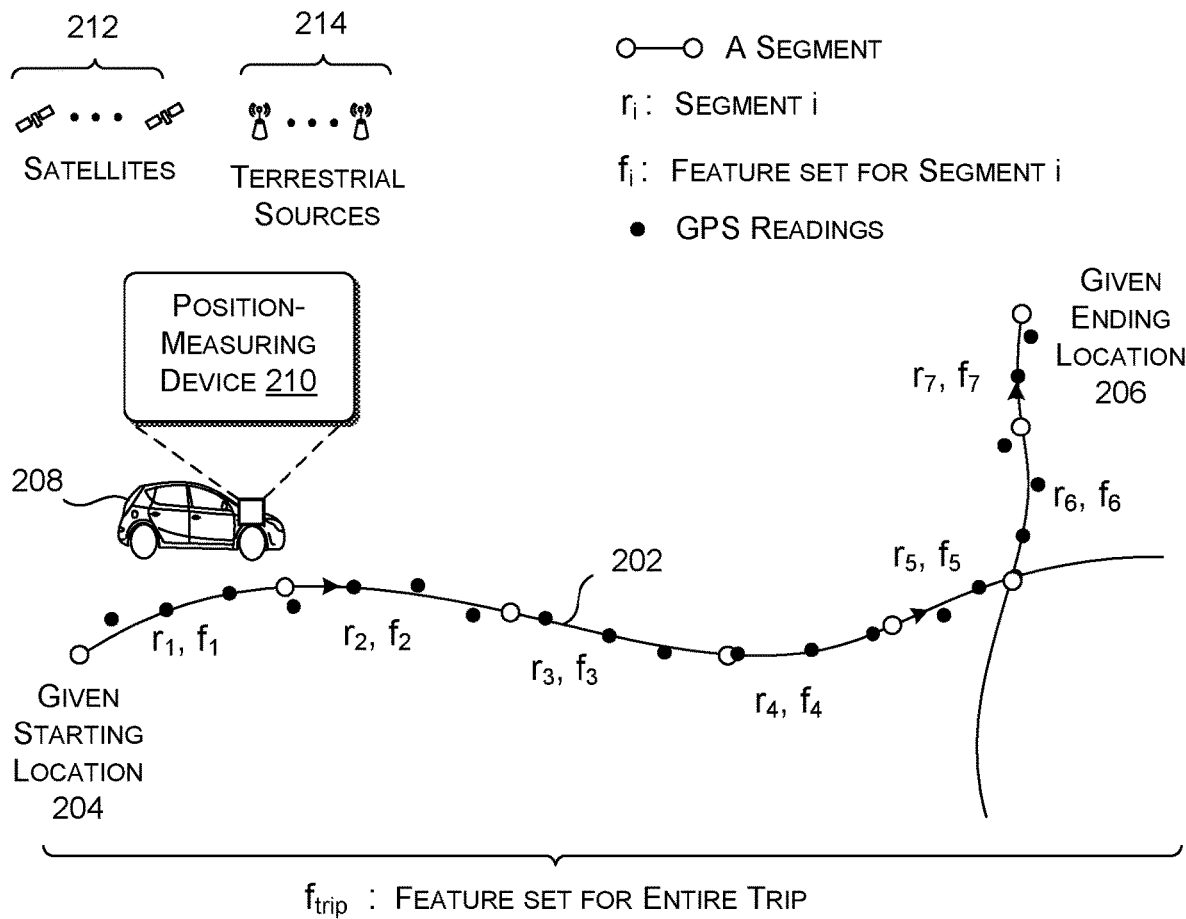
FIG. 2 shows an illustrated candidate route produced by the travel assistance system of FIG. 1.

FIG. 2 shows an illustrated candidate route 202 generated by the travel assistance system 104 of FIG. 1. The route 202 begins at a starting location 204 and ends at an ending location 206. Further, the route 202 is composed of a plurality of segments ($r_1$, $r_2$, $r_3$, . . . $r_n$). Each segment i corresponds to a section of roadway infrastructure having a set of physical properties $f_i$ associated therewith. The trip as a whole is associated with another set $f_{trip}$ of features. Additional information regarding illustrative per-segment features and trip features is set forth in Section B.

A vehicle 208 traverses the route 202 based on guidance provided by an on-board navigation assistance system (not shown). The vehicle 208 includes a position-measuring device 210. Alternatively, or in addition, an occupant (e.g., the driver) of the vehicle 208 carries the position-measuring device 210. The position-measuring device 210 measures the position of the vehicle 208 on a periodic basis (e.g., every three seconds) and/or on any other basis. In some implementations, the position-measuring device 210 is a GPS device that receives signals produced by a system of satellites 212. Alternatively, or in addition, the position-measuring device 210 receives signals from any type of terrestrial wireless signal source(s) 214, such as cell towers and/or WI-FI beacons. This type of position-measuring device 210 identifies the position of the vehicle 208 by performing triangulation, or by assessing the strength of a signal from a beacon. Among other uses, the distribution exploration system 124 leverages the position measurements made by the position-measuring device 210 to help select an appropriate mix of distributions. The training system 126 uses the position measurements to train the machine-trained model 106.

Figure 3:
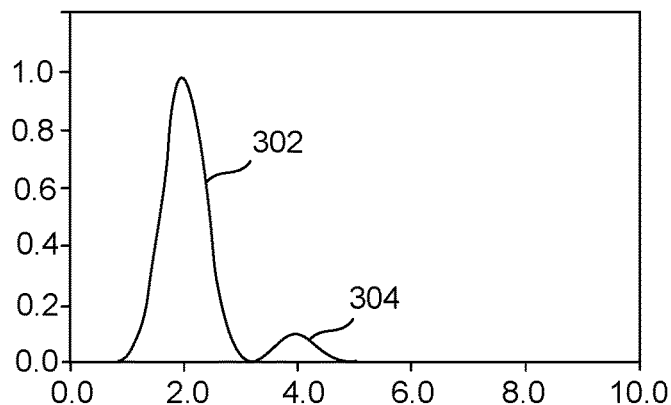
FIG. 3 shows an example of a distribution of time-of-arrival values.

FIG. 3 shows an example of a distribution of measured trip time-of-arrival times associated with a particular route. Note that the distribution includes a first normal-shape curve 302 having a first peak magnitude, and a second normal-shape curve 304 having a second peak magnitude. The second peak magnitude has a lower value than the first peak magnitude. In some implementations, the distribution exploration system 124 models this distribution as a combination of two normal distributions. Note that FIG. 3 is illustrative of one particular environment; other environments give rise to distributions having more than two prominent peaks, or just one prominent peak. Alternatively, or in addition, other environments give rise to distribution shapes that do not match the kind of normal-type shapes shown in FIG. 3.

Various factors may contribute to the shape of the distribution shown in FIG. 3. For instance, assume that a portion of a route under consideration has multiple lanes which accommodate travelers moving at different speeds. An example of a high-speed lane is a high-occupancy vehicle (HOV) lane of a highway. Assume that the first normal-shape curve 302 describes the behavior of drivers who use the faster lanes of a highway, while the second normal-shape curve 304 reflects the behavior of drivers who use the slower lanes. Alternatively, or in addition, assume that a particular region is characterized by two general classes of drivers having different driving habits. For example, consider a college town having a first class of college-age drivers, and a second class of generally older townspeople. Assume that the first normal-shape curve 302 describes the faster-driving behavior of the first class of drivers, while the second normal-shape curve 304 reflects the slower-driving behavior of older local townspeople. In other cases, the shape of a distribution is the result of a combination of complex factors that interact with each other; it may not be possible to conclusively trace the shape of a distribution to its root causes.

B. Illustrative Machine-Trained Model

Figure 4:
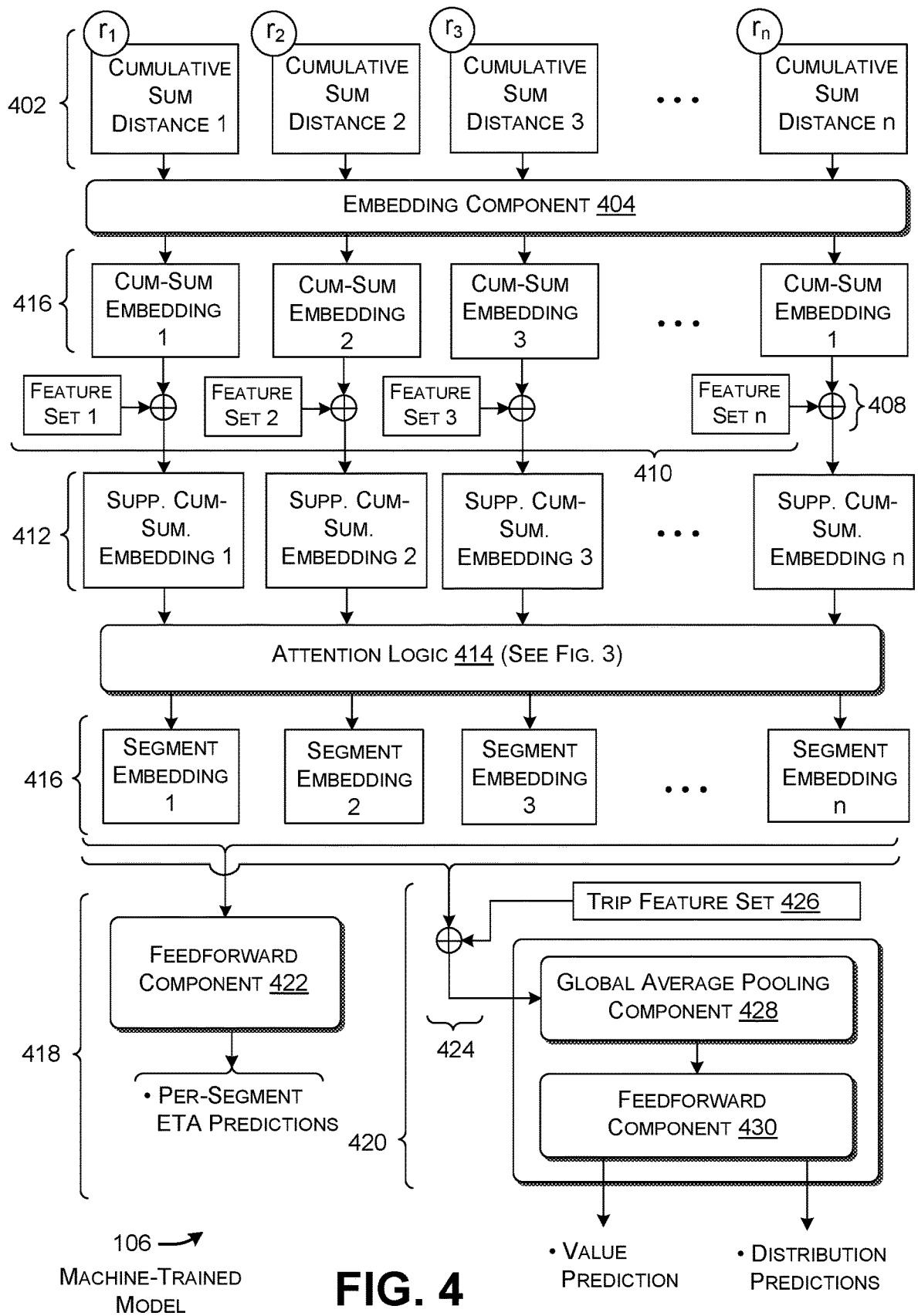
FIG. 4 shows an example of a machine-trained model used by the travel assistance system of FIG. 1.

FIG. 4 shows an example of the machine-trained model 106 used by the travel assistance system 104 of FIG. 1. The machine-trained model 106 maps input information regarding a route under consideration to the three-part ETA information described above. Assume that the route is partitioned into a sequence of segments ($r_1$, $r_2$, $r_3$, . . . $r_n$). In some implementations, the machine-trained model 106 is implemented as a neural network having multiple layers. This section will generally describe the machine-trained model 106 from top to bottom, which corresponds to the direction of data flow through the layers of the machine-trained model 106.

The machine-trained model 106 receives a series of cumulative distance measures 402 associated with the respective segments. Each cumulative distance measure reflects the distance of a segment under consideration, added to the sum of the distances of the preceding segments. For example, assume that the first segment $r_1$ has a length of 2.4 km, the second segment $r_2$ has a length of 4.1 km, and the third segment $r_3$ has a length of 1.4 km. In some implementations, the machine-trained model 106 first bucketizes these distances to whole multiples of 1 km. For instance, the machine-trained model 106 converts a segment having a length between 0 km and 1 km to an integer value of 0 km, converts a segment having a length between 1 km and 2 km to an integer value of 1 km, converts a segment having a length between 2 km and 3 km to an integer value of 2 km, and so on. Accordingly, for the present example, the machine-trained model 106 converts the first segment $r_1$ to a length of 2, the second segment $r_2$ to a length of 4, the third segment $r_3$ to a length of 1, and so on. The cumulative sum distance of the first segment $r_1$ is 2, the cumulative sum distance of the second segment $r_2$ is 6 (that is, 6=2+4), and the cumulative sum distance of the third second $r_3$ is 7 (that is, 7=2+4+1). As one benefit, the coding strategy described above provides a way of expressing the positional relationship among segments without the use of separately-provided position information.

An embedding component 404 maps the cumulative sum distances into respective cumulative-sum embeddings 406. In some implementations, an embedding corresponds to a distributed vector that expresses semantic information pertaining to a cumulative sum distance. Two distributed vectors that lie close to each other in vector space (e.g., as assessed using cosine similarity or any other distance measure) reflect similar semantic concepts. A distributed vector is distinguished, for example, from a one-hot vector, which allocates particular concepts to fixed dimensions of the vector. In some implementations, any type of neural network maps the cumulative sum distances into the cumulative-sum embeddings. Illustrative types of neural networks include a feedforward neural network, a convolutional neural network (CNN), a transformer-based neural network, etc.

A combination component 408 combines (e.g., concatenates) the cumulative-sum embeddings 406 with respective sets 410 of features, which yields feature-supplemented cumulative-sum embeddings 412. Each set of features describes characteristics of a roadway section associated with a particular segment of the route. In some implementations, the features generally describe any of: (a) the length of the segment; (b) different rules that govern how fast a vehicle may travel on the segment; (c) historical speeds and traffic patterns associated with the segment; (d) current traffic conditions associated with the segment (including an indication of the current speed of vehicles on the segment, an indication of whether the traffic over the segment is currently blocked, etc.); (e) various rules that govern how a vehicle may turn while traveling on the segment; (f) a lane structure of the segment; (g) various physical properties of the segment's roadway surface (including whether the segment is paved, etc.); (h) whether the segment is part of a parking lot, an alley, a ramp, etc.; (i) a manner in which the segment intersects other roadways; (j) a kind of divider type used to separate opposite-moving traffic over the segment; (k) whether driving on the segment is subject to a toll; (l) whether the roadway is private; (m) whether the locale through which the segment passes is considered scenic; (n) whether a user is permitted to walk on the segment, ride a bicycle on the segment, etc., and so on.

Attention logic 414 maps the feature-supplemented cumulative-sum embeddings 412 to respective segment embeddings. One implementation of the attention logic 414 is set forth below in the context of the explanation of FIG. 5. By way of overview, the attention logic 414 is transformer-based functionality that computes the relevance that each feature-supplemented cumulative-sum embedding 412 has in the interpretation of each other feature-supplemented cumulative-sum embedding 412. The attention logic 414 also computes the relevance that each feature-supplemented cumulative-sum embedding 412 has in the interpretation of itself. By virtue of this analysis, the machine-trained model 106 is able to detect complex inter-segment relations, in which the features of one part of a route play a role in the traversal of another part of the route.

Post-attention logic transforms the segment embeddings 416 into the three-part ETA information. In particular, the post-attention logic includes two branches (418, 420). A first branch 418 includes a feedforward component 422. The feedforward component 422 uses a feedforward neural network to map the segment embeddings into per-segment estimates of the amount of time required to traverse the individual segments. That is, the feedforward component 422 predicts the amount of time that will be required to traverse the first segment $r_1$, the amount of time that will be required to traverse the second segment $r_2$, and so on.

The second branch 420 of the post-attention logic maps the segment embeddings 416 into an estimate of the time-of-arrival for the entire trip. The second branch 420 also maps the segment embeddings 416 into a prediction of the distribution parameters. Consider, for instance, the example in which the time-of-arrival information for the trip is modeled using two normal distributions. The second branch 420 predicts the mean ($\mu$) and standard deviation ($\sigma$) of each normal distribution.

More specifically, the second branch 420 includes a combination component 424 for combining (e.g., concatenating) a set of trip features 426 with each of the segment embeddings 416, to produce a plurality of supplemented segment embeddings (which are not individually depicted in FIG. 4 to facilitate illustration). In one implementation, the set of trip features 426 specifies the time of departure for the trip, e.g., by specifying the day of the week and the hour of the day of the departure. Other trip features specify the type of traveler who will make the trip, the type of vehicle that will make the trip, and so on.

A global average pooling component 428 pools the supplemented segment embeddings into a single embedding. In one implementation, the global average pooling component 428 generates each value of the single embedding for a particular dimension by forming the average of the values of the supplemented segment embedding at the corresponding dimension. For example, the global average pooling component 428 generates a value for the first dimension of the single embedding by forming the average of the values at the first dimension of the supplemented segment embeddings. Other implementations use other pooling strategies to compress plural vectors into a single vector. For example, another implementation generates a sum of the supplemented segment embeddings. A feedforward component 430 uses a feedforward neural network to map the single embedding into an estimate of the time-of-arrival for the entire trip, and an estimate of the distribution parameters.

The machine-trained model 106 shown in FIG. 4 is computationally efficient in both its training and inference (production) stages. Further, in some implementations the machine-trained model 106 runs on a central processing unit (CPU), and does not require use of specialized hardware, including a graphics processing unit (GPU), tensor processing unit (TPU), neural processing unit (NPU), etc. Further, the machine-trained model 106 has low latency. In some implementations, it returns ETA information 2 ms after a user submits input information. Further, the machine-trained model 106 provides a way of considering inter-segment interactions, and for efficiently merging heterogeneous features in its analysis. Further, the machine-trained model 106 provides a way of efficiently combining features of different scopes, e.g., by integrating segment-level features at a first level and trip-level features at a second level. Further, the machine-trained model 106 is scalable in the sense that the same model architecture can be trained based on different environment-specific combinations of features.

Figure 5:
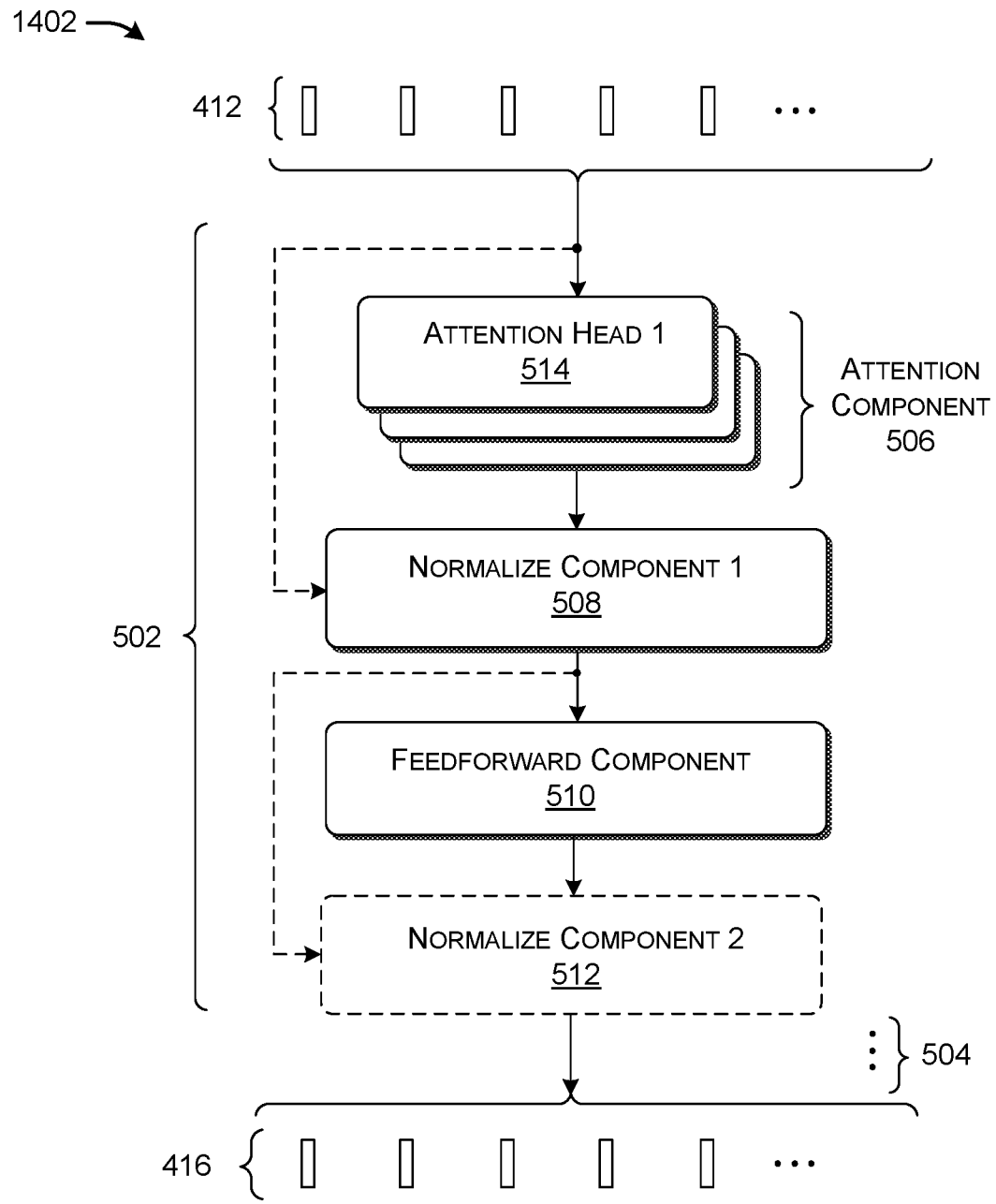
FIG. 5 shows an example of attention logic used by the machine-trained model of FIG. 4.

FIG. 5 shows an example of the attention logic 414 used by the machine-trained model 106 of FIG. 4. The attention logic 414 includes a transformer-based block 502. As represented by the ellipsis 504, other implementations of the attention logic 414 include a pipeline of transformer-based blocks, each of which has the same components as the transformer-based block 502, but is governed by its own set of machine-trained weights. The transformer-based block 502 includes, in order, an attention component 506, a first add-and-normalize component 508, a feedforward neural network (FFN) component 510, and a second add-and-normalize component 512. FIG. 5 shows the second add-and-normalize components 512 in dashed lines to indicate that it can be omitted. Likewise, FIG. 5 shows the residual connections feeding into the add-and-normalize components (508, 512) in dashed lines to indicate that they may be omitted.

The attention component 506 performs attention analysis using the following equation:

$$attn(Q, K, V) = \text{Softmax}\left(\frac{QK^T}{\sqrt{d}}\right)V. \quad (1)$$

The attention component 506 produces query information Q by multiplying the supplemented cumulative-sum embeddings 412 by a query weighting matrix $W^Q$. Similarly, the attention component 506 produces key information K and value information V by multiplying the supplemented cumulative sum embeddings 412 by a key weighting matrix $W^K$ and a value weighting matrix WY, respectively. To execute Equation (1), the attention component 506 takes the dot product of Q with the transpose of K, and then divides the dot product by a scaling factor $\sqrt{d}$, to produce a scaled result The symbol d represents the dimensionality of Q and K. The attention component 506 takes the Softmax (normalized exponential function) of the scaled result, and then multiplies the result of the Softmax operation by V, to produce attention output information. More generally stated, the attention component 506 determines how much emphasis should be placed on parts of the input information when interpreting other parts of the input information (and when interpreting itself). Background information regarding the general concept of attention is provided in VASWANI, et al., "Attention Is All You Need," in 31 st Conference on Neural Information Processing Systems (NIPS 2017), 2017, 9 pages.

Note that FIG. 5 shows that the attention component 506 is composed of plural attention heads, including a representative attention head 514. Each attention head performs the computations specified by Equation (1), but with respect to a particular representational subspace that is different than the subspaces of the other attention heads. To accomplish this operation, the attention heads perform the computations described above using different respective sets of query, key, and value weight matrices. Although not shown, the attention component 506 concatenates the output results of the attention component's separate attention heads, and then multiplies the results of this concatenation by another weight matrix $W^O$.

The add-and-normalize component 508 includes a residual connection that combines (e.g., sums) input information fed to the attention component 506 with the output information generated by the attention component 506. The add-and-normalize component 414 then layer-normalizes the output information generated by the residual connection, e.g., by normalizing values in the output information based on the mean and standard deviation of those values. The optional other add-and-normalize component 512 performs the same functions as the first-mentioned add-and-normalize component 508. The FFN component 510 transforms input information to output information using a feedforward neural network having any number of layers. The first transformer-based block 502 produces the segment embeddings 416, or serves as output results which feed into another transformer-based block (not shown in FIG. 5).

FIG. 6 shows a process 602 that represents an overview of one manner of operation of the travel assistance system 104 of FIG. 1. Note that the process 602 is expressed as a series of operations performed in a particular order. But the order of these operations is merely representative, and the operations are capable of being varied in other implementations. Further, any two or more operations described below can be performed in a parallel manner. In one implementation, the blocks shown in the process 602 that pertain to processing-related functions are implemented by the computing equipment described in connection with FIGS. 13 and 14.

In block 604, the travel assistance system 104 receives a starting location corresponding to a physical location at which a trip is to begin, and an ending location corresponding to a physical location at which the trip is to end. In block 606, the travel assistance system 104 uses a computer-implemented route-finding technique to identify a route between the starting location and the ending location. The route includes a sequence of segments. The segments correspond to respective sections of physical roadway infrastructure. In block 608, the travel assistance system 104 uses the machine-trained model 106 to map information regarding the segments to time-of-arrival (ETA) information. The machine-trained model 106 corresponds to a neural network that is trained based on a loss function that models the ETA information using a mixture of two or more distributions. In block 610, the ETA information is used to provide guidance in navigating between the starting location and the ending location via the route.

Note that the process 602 includes a route-finding operation (in block 606) combined with an ETA-generating operation (in block 608). In other cases, a process involves receiving a route produced by any route-finding operation, and then calculating ETA information for that route.

C. Illustrative Distribution Exploration System and Training System

FIG. 7 shows one implementation of the distribution exploration system 124. The distribution exploration system 124 provides computer-implemented tools for assisting a developer in deciding the type(s) and number of distributions to use in approximating the distribution of trip time-of-arrival values.

A data store 702 stores position measurements produced by vehicles in traversing various routes. For example, each vehicle emits a GPS reading every three seconds as it traverses a particular route, from a specified starting location to an ending location. The position-measuring device (of FIG. 2) is subject to error. As a result, each of the position measurements that it produces may not exactly overlap a road segment; rather, the position measurement may lie near one or more road segments. The map-matching component 704 performs the initial task of snapping each of the position measurements to the most likely road segment. The map-matching component 704 produces a set of matched routes as a result of its analysis, which it stores in a data store 706.

Different implementations of the map-matching component 704 work in different respective ways. In one implementation, the map-matching component 704 snaps each position measurement to the nearest road segment. In another implementation, the map-matching component 704 uses a Hidden Markov model (HMM) to map a sequence of position measurements to the most likely road segments. Additional information regarding the HMM-based implementation is set forth below with respect to the explanation of FIG. 8.

A trip-aggregating component 708 forms groups of trips that are considered as describing the same route. To perform this task, for each trip, the trip-aggregating component 708 identifies a starting map tile which contains the starting location of the trip, and an ending map tile which contains the ending location of the trip. A map tile corresponds to a portion of a map of predetermined size, such as a region of size 1 km by 1 km. Two routes which share the same starting map tile and ending map tile are considered as describing the same route. The trip-aggregating component 708 stores the thus-formed groups of trips in a data store 710. To reduce the influence of lower-confidence groups, the trip-aggregating component 708 only stores a group if it has more than 100 trips taken within a given hour. Each group associated with a particular route provides a distribution of time-of-arrivals for that route.

A distribution-fitting system 712 provides a set of tools that enables a developer to estimate the combination of distributions which most effectively approximates the data in the data store 710. In some implementations, for instance, the distribution-fitting system 7012 fits position measurements to the distributions using maximum likelihood estimation (MLE), per the following equation:

$$\hat{\theta} = \arg\max_\theta \prod_{i=1}^{n} f(x_i|\theta). \quad (2)$$

In this equation, θ represents a set of distribution parameters. The symbol $f$ represents the probability density function with respect to position measurements x. Equation (2) generates a product of the probability density function over n trips specified in the data store 710. MLE analysis finds the combination of distribution parameters that maximizes the product of Equation (2).

In the particular case of a normal distribution, the mean (μ) and standard deviation (σ) are given by:

$$\hat{\mu} = \frac{1}{n}\sum_{i}^{n} x_i; \quad \hat{\sigma} = \sqrt{\frac{1}{n}\sum_{i}^{n}(x_i - \hat{\mu})^2}. \quad (3)$$

For the particular case of a lognormal distribution, the mean (μ) and standard deviation (σ) are given by:

$$\hat{\mu} = \frac{1}{n}\sum_{i}^{n} \ln(x_i); \quad \hat{\sigma} = \sqrt{\frac{1}{n}\sum_{i}^{n}(\ln(x_i) - \hat{\mu})^2}. \quad (4)$$

As another tool, the distribution-fitting system 712 uses the kernel density estimation (KDE) method to visualize the shape of a trip's distribution. The KDE method uses an impulse function having a particular shape to represent each position measurement, and then sums the contributions of the impulse functions. Mathematically, the KDE method generates an estimate $\hat{f}_h$ at the position x over a set of position measurements $x_i$, as given by:

$$\hat{f}_h = \frac{1}{nh}\sum_{i}^{n} K\left(\frac{x - x_i}{h}\right). \quad (5)$$

In this equation, K is the kernel density function. In some implementations, the distribution-fitting component 712 uses a Gaussian kernel with a bandwidth h chosen by Scott's rule, $h = n^{-0.2}$.

The distribution-fitting component 712 next verifies the goodness-of-fit of the position measurements to the hypothesized mixture of distributions. In some implementations, the distribution-fitting component 712 performs this analysis using the Kolmogorov-Smirnov (K-S) test. The K-S test provides a way of determining whether: (a) a null hypothesis is rejected; or (b) whether the null hypothesis cannot be rejected. In the present case, the null hypothesis specifies that the position measurements conform to a hypothesized theoretical distribution F(x). The alternative hypothesis specifies that the position measures do not match the theoretical distribution F(x).

More specifically, the K-S test computes the maximum separation D between an empirical distribution function $F_n$ and the hypothesized distribution function F(x):

$$D = \sup_{x} |Fn(x) - F(x)|. \quad (6)$$

Here, the maximum is expressed as the suprema of the absolute difference between $F_n(x)$ and F(x). The empirical distribution function $F_n(x)$ is computed on the basis of the position measurements. It corresponds to a cumulative sum given by $$\frac{1}{n}\sum_{i}^{n} 1_{x_i < x}.$$

The K-S test provides unreliable results in those cases in which the theoretical distribution function F(x) is derived from the empirical data. That is the case here, as a developer chooses the theoretical distribution by analyzing the position measurements. To address this situation, the distribution-fitting component 712 uses a bootstrapping method to estimate a distribution of D values from the position measurements.

More specifically, assume that there are k samples in the original set of position measurements. The distribution-fitting component 712 randomly selects samples from this empirical set to generate another set of k samples. Although drawn from the same source, the new set of samples will have a different set of members than the original set of samples. This is because, for instance, the new set of samples can include duplicates drawn from the original set of samples, and/or can omit some of the samples in the original set of samples. The distribution-fitting component 712 generates a new empirical distribution function $F'_n(x)$ based on the new set of samples. The distribution-fitting component 712 then computes a new value D' using Equation (6), but with $F'_n(x)$ replacing the original function $F_n(x)$. The distribution-fitting component 712 repeats the above-described steps to generate a distribution of D' values. As will be described further below, the original D values and the distribution of D' values provide reduced-bias evidence of whether the proposed mixture of distributions is a good match of the position measurements.

FIG. 8 shows an example that explains one way in which the map-matching component 704 performs its function using HMM analysis. FIG. 8 specifically shows a first position measurement $z_t$ that occurs at time t, and a subsequent position measurement $z_{t+1}$ that occurs at time t+1. Assume that the first position measurement $z_t$ is closest to position $x_{t,1}$ that is located on a first route $r_1$, and that the second position measurement $z_{t+1}$ is closest to a position $x_{t+1,2}$ that is located on a second route $r_2$. Assume that a route distance d, 802 separates the position $x_{t,1}$ and the position $x_{t+1,2}$, and that a great-circle distance $d_{gc}$ 804 separates the first position measurement $z_t$ and the second position measurement $z_{t+1}$. A route distance describes how far the user must travel between $x_{t,1}$ and $x_{t+1,2}$ by traversing routes $r_1$ and $r_2$. A great circle distance reflects the shortest distance over the spherical surface of the earth.

The map-matching component 704 determines measurement probabilities (also called emission probabilities) for each possible state at each time. A state corresponds to a possibility that the user is traversing a particular route at a particular time, given a particular position measurement. More formally stated, a measurement probability $p(z_t|r_i)$ reflects the probability that, at the time that the vehicle records position measurement $z_t$, it is traveling on a route $r_i$. In some implementations, the map-matching component 704 determines $p(z_t|r_i)$ using the following equation:

$$p(z_t|r_i) = \frac{1}{\sqrt{2\pi}\sigma_z} e^{-0.5\left(\frac{\|z_t - x_{t,i}\|_{gc}}{\sigma_z}\right)^2}. \qquad (7)$$

In this equation, $\sigma_z$ is the standard deviation of the GPS measurements. $\|z_t - x_{t,i}\|_{gc}$ reflects the great circle distance between $z_t$ and the closest position on the route i. Equation (7) reflects the intuition that it becomes increasingly unlikely that a particular route matches a particular position measurement as the distance between that route and the measurement grows larger. In the example of FIG. 8, the measurement probability that the vehicle is located on route $r_2$ at time t+1 depends on the great circle distance between $z_{t+1}$ and $x_{t+1,2}$. The map-matching component 704 interprets a set of initial state probabilities It; as the first-state measurement probabilities $p(z_1|r_1)$.

The map-matching component 704 also defines a plurality transition probabilities that describe the probabilities of transitioning between specified pairings of state. That is, a transition probability $p(d_t)$ describes the probability of transitioning from a first given state at time t to a second given state at time t+1. In some implementations, $d_t$ is given by:

$$d_t = |\|z_t - z_{t+1}\|_{gc} - \|x_{t,i} - x_{t+1,j}\|_{route}| \qquad (8).$$

The first difference component in Equation (8) reflects the great circle (gc) difference between $z_t$ and $z_{t+1}$. The second difference component in Equation (8) reflects the driving distance (route) between $x_{t,i}$ and $x_{t+1,j}$ on route $r_j$. The subscripts gc and route represent the great circle distance and the route distance, respectively. Overall, Equation (8) computes the distances between the first (great circle) distance and the second (route) distance. In the example of FIG. 8, the distance $d_t$ reflects the difference between the great circle distance 804 and the route distance 802. The probability $p(d_t)$ is given by:

$$p(d_t) = 1/\beta e^{-d_t/\beta} \qquad (9).$$

The symbol β represents a constant. In some implementations, the map-matching component 704 uses the Viterbi algorithm to find the most probable association between measurements and routes. That is, the Viterbi algorithm uses dynamic programming to find a path through a Viterbi lattice that maximizes the product of the measurement probabilities and the transition probabilities.

FIG. 9 shows a distribution of D' values calculated by the distribution-fitting system 712 using the K-S test for different sets of resampled measurements. FIG. 9 also shows the value D (represented by line 902) that is computed for the original set of measurements. The area under the curve to the right of D represents the p value of the K-S test. A span 904 represents a range that encompasses 95% of the measurements. As shown in FIG. 2, the value D is within the span 904 of D' values. This reflects the conclusion that sufficient evidence is lacking to reject the null hypothesis. Recall that the null hypothesis is that the empirical distribution conforms to the hypothesized theoretical distribution.

FIG. 10 shows an example of distribution-fitting results produced by the distribution exploration system 124 of FIG. 8. The table shown in FIG. 10 specifically represents the percentage of successfully fitted routes with goodness-of-fit p-values larger than 0.05. FIG. 10 reveals that a mixture of distributions approximates the empirical distribution more effectively than a single distribution. Further, FIG. 10 reveals that a mixture of lognormal distributions approximates the empirical distribution more effectively than a mixture of normal distributions. However, the computation of lognormal distributions is more resource-intensive than the computation of normal distributions. For this reason, a developer may choose to use a combination of two normal distributions to model the measurements. Note that the combination of three normal distributions is more effective than the combination of two normal distributions, but the difference between two and three normal distributions is not great enough to justify the additional processing resources that would be required to train and use a machine-trained model based on three normal distributions.

Other implementations of the distribution exploration system 124 permit a developer to explore the suitability of any type of distribution, not limited to normal and lognormal distributions. Examples of other kinds of distributions include: gamma distributions, log student-t distributions, multi-variate Gaussian distributions, etc. In other cases, a custom reference distribution may be empirically defined based on observations of travel data. Further, the distribution exploration system 124 allows a developer to explore a combination of distributions of two or more types. Note that different geographic regions may be characterized by different types of roadway infrastructure, different laws, different kinds of weather, different kinds of driving behaviors, etc. This means that the measurements collected in a particular geographic region may or may not represent the distributions associated with other regions. Thus, a developer in a new region may choose to interact with the distribution exploration system 124 to explore the traffic patterns associated with the new geographic region, rather than assuming that a preexisting machine-trained model developed for another geographic region applies to the new geographic region.

Figure 11:
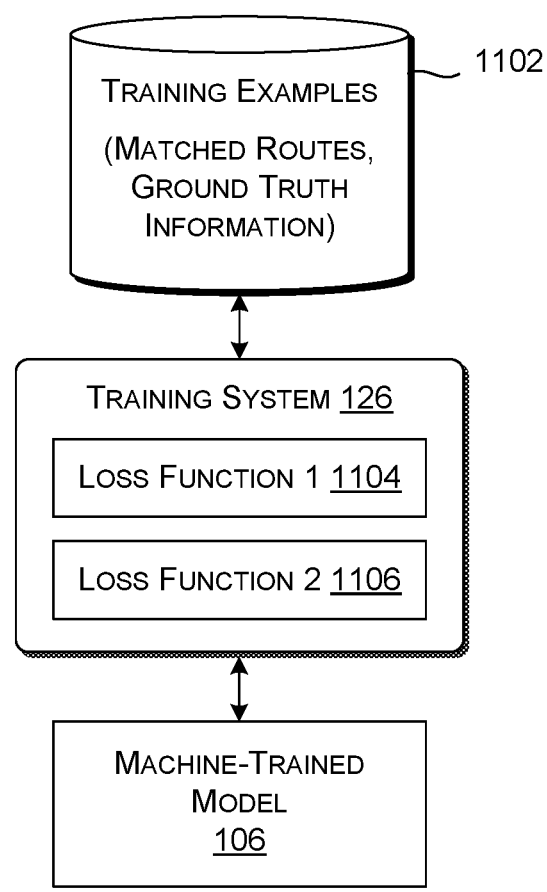
FIG. 11 shows one implementation of a training system, which is another part of the computing system of FIG. 1.

FIG. 11 shows one implementation of the training system 126. The training system 126 trains the machine-trained model 106. The training system 126 performs training based on the assumption that the machine-trained model 106 approximates a particular mixture of distributions. In the following explanation, the training system 126 specifically performs training based on the assumption that the machine-trained model 106 approximates a mixture of two normal distributions.

A data store 1102 provides a corpus of training examples. Each training example includes a route that has been traversed, together with time-of-arrival information for the route. The time-of-arrival information constitutes ground-truth information. The training system 126 uses the machine-trained model 106 to generate a scalar prediction p of the time-of-arrival for the entire trip, and a time-of-traversal for each segment of a route. Further, the training system 126 uses the machine-trained model 106 to generate a prediction P of the distribution parameters of the mixture of distributions. For a particular training example, the training system 126 computes the difference between the ground-truth information and the prediction, which constitutes error information. The training system 126 updates the weights of the machine-trained model 106 based on the error information. More formally stated, in some implementations, the training system 126 uses stochastic gradient descent in combination with back-projection to iteratively update the weights of the machine-trained model 106.

In some implementations, the training system 126 generates loss information by summing the results of two loss functions (1104, 1106). The first loss function 1104 approximates error in the scalar predictions using Mean Absolute Percentage Error (MAPE):

$$L(\hat{p}, p) = \frac{1}{N} \sum \frac{|\hat{p} - p|}{p}. \tag{10}$$

The symbol p represents the actual amount of time that is required to traverse the route (or to the amount of time that is required to traverse a particular segment of the route). N is the number of training examples.

The second loss function 1106 attempts to maximize the likelihood of the observed travel time p using the following equation:

$$(\hat{P}, p) = -1/N \Sigma \hat{P}(p) \tag{11}.$$

For the case of a mixture of two normal distributions, $\hat{P}(p)$ can be expressed as:

$$\hat{P}(p) = s(cdf(p+\delta|\hat{\mu}_1,\hat{\sigma}_1) - cdf(p-\delta|\hat{\mu}_1,\hat{\sigma}_1)) + (1-s)(cdf(p+\delta|\hat{\mu}_2,\hat{\sigma}_2) - cdf(p-\delta|\hat{\mu}_2,\hat{\sigma}_2)) \tag{12}.$$

In Equation (12), $\delta$ is a small noise value, such as 1e−5. cdf refers to a cumulative distribution function, for example, as given by:

$$cdf(x|\mu, \sigma) = \frac{1}{2}\left[1 + \text{erf}\left(\frac{x-\mu}{\sigma\sqrt{2}}\right)\right]. \tag{13}$$

In the body of Equation (13), erf refers to the error function. The estimated distribution parameters associated with Equations (11)-(13) include: s, $\hat{\mu}_1$, $\hat{\sigma}_1$, $\hat{\mu}_2$ and $\hat{\sigma}_2$. The parameters $\hat{\mu}_1$ and $\hat{\sigma}_1$ represent the mean and standard deviation of the first normal distribution, and the parameters $\hat{\mu}_2$ and $\hat{\sigma}_2$ represent the mean and standard deviation of the second normal distribution. The symbol s represents a scalar between 0 and 1, which is used to specify the distribution of weights between the first and second normal distributions.

Figure 12:
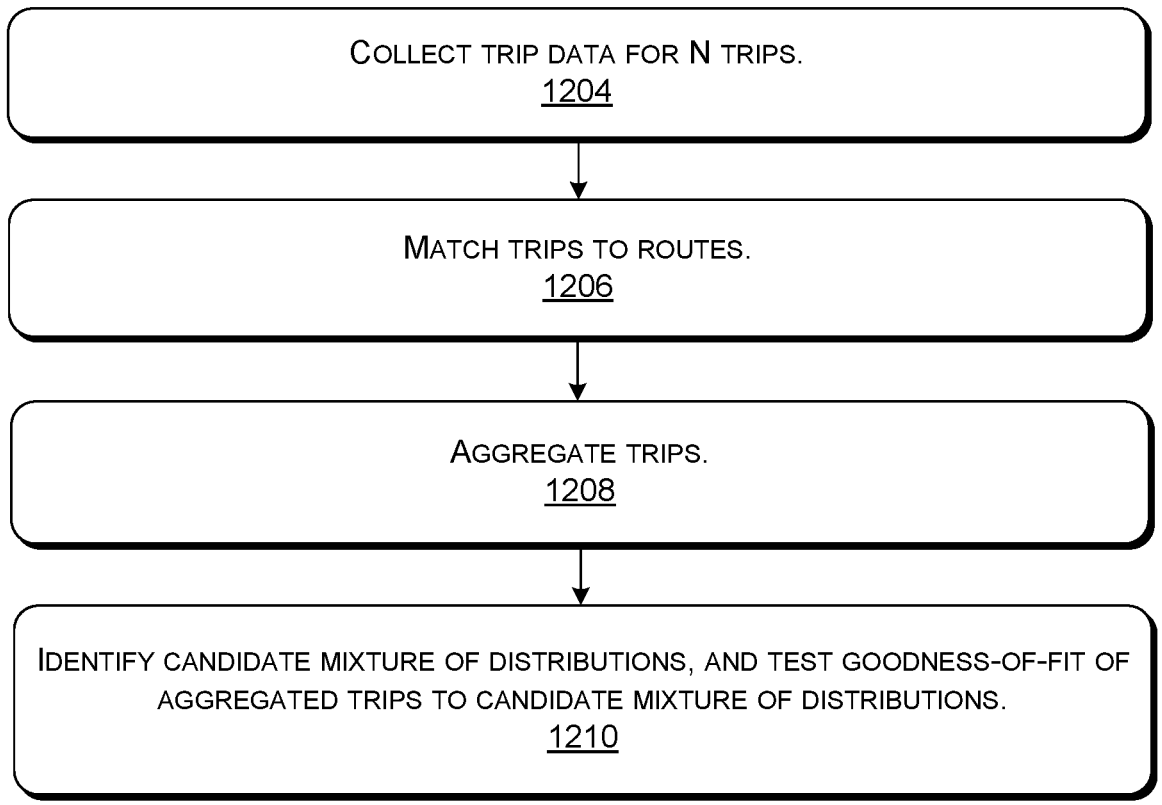
FIG. 12 shows a process that explains one manner of operation of the distribution exploration system of FIG. 7.

FIG. 12 shows a process 1202 that explains one manner of operation of the distribution exploration system 124. The comments given above with respect to the explanation of FIG. 6 also apply to FIG. 12. In block 1204, the distribution exploration system 124 collects data for a collection of trips. In block 1206, the distribution exploration system 124 maps the trips to routes. In block 1208, the distribution exploration system 124 aggregates trips that have the same starting and ending locations into groups. In block 1210, the distribution exploration system 124 identifies a candidate mixture of distributions to describe the measurements, and estimates the goodness-of-fit of the measurements to the candidate mixture of distributions.

D. Illustrative Computing Functionality

FIG. 13 shows computing equipment 1302 that, in some implementations, is used to implement the computing system 102 of FIG. 1. The computing equipment 1302 includes a set of local devices 1304 coupled to a set of servers 1306 via a computer network 1308. Each local device corresponds to any type of computing device, including any of a desktop computing device, a laptop computing device, a handheld computing device of any type (e.g., a smartphone or a tablet-type computing device), a mixed reality device, an intelligent appliance, a wearable computing device (e.g., a smart watch), an Internet-of-Things (IoT) device, a gaming system, an immersive "cave," a media device, a vehicle-borne computing system, any type of robot computing system, a computing system in a manufacturing system, etc. In some implementations, the computer network 1308 is implemented as a local area network, a wide area network (e.g., the Internet), one or more point-to-point links, or any combination thereof.

The dashed-line box in FIG. 13 indicates that the functionality of the computing system 102 is capable of being spread across the local devices 1304 and/or the servers 1306 in any manner. For instance, in some cases, each local device, or a group of affiliated local devices, implements the entirety the computing system 102. In other implementations, the servers 1306 implement the entirety of the computing system 102. Here, an individual user interacts with the servers 1306 via a browser application or other local functionality provided by a local device. In other implementations, the functions of the computing system 102 are distributed between each local device and the servers 1306. For example, in one case, the servers 1306 implement the machine-trained model 106, and each local device implements the remainder of the functions shown in FIG. 1.

FIG. 14 shows a computing system 1402 that, in some implementations, is used to implement any aspect of the mechanisms set forth in the above-described figures. For instance, in some implementations, the type of computing system 1402 shown in FIG. 14 is used to implement any local computing device or any server shown in FIG. 13. In all cases, the computing system 1402 represents a physical and tangible processing mechanism.

The computing system 1402 includes a processing system 1404 including one or more processors. The processor(s) include one or more Central Processing Units (CPUs), and/or one or more Graphics Processing Units (GPUs), and/or one or more Application Specific Integrated Circuits (ASICs), and/or one or more Neural Processing Units (NPUs), and/or one or more Tensor Processing Units (TPUs), etc. More generally, any processor corresponds to a general-purpose processing unit or an application-specific processor unit.

The computing system 1402 also includes computer-readable storage media 1406, corresponding to one or more computer-readable media hardware units. The computer-readable storage media 1406 retains any kind of information 1408, such as machine-readable instructions, settings, model weights, and/or other data. In some implementations, the computer-readable storage media 1406 includes any of one or more solid-state devices, one or more magnetic hard disks, one or more optical disks, magnetic tape, etc. Any instance of the computer-readable storage media 1406 uses any technology for storing and retrieving information. Further, any instance of the computer-readable storage media 1406 represents a fixed or removable unit of the computing system 1402. Further, any instance of the computer-readable storage media 1406 provides volatile and/or non-volatile retention of information.

More generally, any of the storage resources described herein, or any combination of the storage resources, is to be regarded as a computer-readable medium. In many cases, a computer-readable medium represents some form of physical and tangible entity. The term computer-readable medium also encompasses propagated signals, e.g., transmitted or received via a physical conduit and/or air or other wireless medium. However, the specific term "computer-readable storage medium" or "storage device" expressly excludes propagated signals per se in transit, while including all other forms of computer-readable media; a computer-readable storage medium or storage device is "non-transitory" in this regard.

The computing system 1402 utilizes any instance of the computer-readable storage media 1406 in different ways. For example, in some implementations, any instance of the computer-readable storage media 1406 represents a hardware memory unit (such as random access memory (RAM)) for storing information during execution of a program by the computing system 1402, and/or a hardware storage unit (such as a hard disk) for retaining/archiving information on a more permanent basis. In the latter case, the computing system 1402 also includes one or more drive mechanisms 1410 (such as a hard drive mechanism) for storing and retrieving information from an instance of the computer-readable storage media 1406.

In some implementations, the computing system 1402 performs any of the functions described above when the processing system 1404 executes computer-readable instructions stored in any instance of the computer-readable storage media 1406. For instance, in some implementations, the computing system 1402 carries out computer-readable instructions to perform each block of the processes described with reference to FIGS. 6 and 12. FIG. 14 generally indicates that hardware logic circuitry 1412 includes any combination of the processing system 1404 and the computer-readable storage media 1406.

In addition, or alternatively, the processing system 1404 includes one or more other configurable logic units that perform operations using a collection of logic gates. For instance, in some implementations, the processing system 1404 includes a fixed configuration of hardware logic gates, e.g., that are created and set at the time of manufacture, and thereafter unalterable. In addition, or alternatively, the processing system 1404 includes a collection of programmable hardware logic gates that are set to perform different application-specific tasks. The latter category of devices includes Programmable Array Logic Devices (PALs), Generic Array Logic Devices (GALs), Complex Programmable Logic Devices (CPLDs), Field-Programmable Gate Arrays (FPGAs), etc. In these implementations, the processing system 1404 effectively incorporates a storage device that stores computer-readable instructions, insofar as the configurable logic units are configured to execute the instructions and therefore embody or store these instructions.

In some cases (e.g., in the case in which the computing system 1402 represents a user computing device), the computing system 1402 also includes an input/output interface 1414 for receiving various inputs (via input devices 1416), and for providing various outputs (via output devices 1418). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers and/or gyroscopes), etc. In some implementations, one particular output mechanism includes a display device 1420 and an associated graphical user interface presentation (GUI) 1422. The display device 1420 corresponds to a liquid crystal display device, a light-emitting diode display (LED) device, a cathode ray tube device, a projection mechanism, etc. Other output devices include a printer, one or more speakers, a haptic output mechanism, an archival mechanism (for storing output information), etc. In some implementations, the computing system 1402 also includes one or more network interfaces 1424 for exchanging data with other devices via one or more communication conduits 1426. One or more communication buses 1428 communicatively couple the above-described units together.

The communication conduit(s) 1426 is implemented in any manner, e.g., by a local area computer network, a wide area computer network (e.g., the Internet), point-to-point connections, or any combination thereof. The communication conduit(s) 1426 include any combination of hardwired links, wireless links, routers, gateway functionality, name servers, etc., governed by any protocol or combination of protocols.

FIG. 14 shows the computing system 1402 as being composed of a discrete collection of separate units. In some cases, the collection of units corresponds to discrete hardware units provided in a computing device chassis having any form factor. FIG. 14 shows illustrative form factors in its bottom portion. In other cases, the computing system 1402 includes a hardware logic unit that integrates the functions of two or more of the units shown in FIG. 14. For instance, in some implementations, the computing system 1402 includes a system on a chip (SoC or SOC), corresponding to an integrated circuit that combines the functions of two or more of the units shown in FIG. 14.

The following summary provides a set of illustrative examples of the technology set forth herein.

(A1) According to a first aspect, a method (e.g., the process 602) is described for providing assistance in navigating over a geographic region. The method includes: receiving (e.g., in block 604) a starting location, the starting location being a physical location at which a trip is to begin, and an ending location, the ending location being a physical location at which the trip is to end; using (e.g., in block 606) a computer-implemented route-finding technique to identify a route between the starting location and the ending location, the route including a sequence of segments, the segments being associated with respective sections of physical roadway infrastructure; and using (e.g., in block 608) a machine-trained model (e.g., the machine-trained model 106) to map information regarding the segments to time-of-arrival (ETA) information, the machine-trained model being implemented as a neural network that is trained based on a loss function that models the ETA information using a mixture of two or more distributions. The ETA information provides guidance in navigating between the starting location and the ending location via the route (as represented by block 610).

(A2) According to some implementations of the method of A1, the two or more distributions are two or more normal distributions, and/or two or more lognormal distributions.

(A3) According to some implementations of the methods of A1 or A2, a type of the two or more distributions is determined by: receiving a collection of position measurements produced in making plural trips; associating the position measurements with plural routes; forming groups of routes, each group of routes having a same starting location and a same ending location; identifying, based on the groups of routes, a candidate type of the two or more distributions; and measuring goodness-of-fit between the groups of routes and the candidate type of the two or more distributions.

(A4) According to some implementations of any of the methods A1-A3, the ETA information includes an estimate of a time-of-arrival for the trip as a whole, and an estimate of parameters of the two or more distributions.

(A5) According to some implementations of the method of A4, the ETA information also includes an indication of how much time is required to traverse each segment.

(A6) According to some implementations of the method A4, the parameters include means and standard deviations of the two or more distributions.

(A7) According to some implementations of any of the methods A1-A6, the using the machined model includes: providing input information that describes distances and features associated with the sequence of segments in the route; mapping the input information to a plurality of segment embeddings using attention logic; and mapping the segment embeddings and a set of trip features to the ETA information.

(A8) According to some implementations of the method A7, the attention logic operates by: assessing relevance between parts of the input information, to produce attention output results; normalizing the attention output results to produce normalized results; and mapping the normalized results into the segment embeddings using a feedforward neural network.

(A9) According to some implementations of any of the methods A1-A6, the using the machine-trained model includes: generating plural cumulative-sum distances for the respective segments of the route; encoding the cumulative-sum distances into respective cumulative-sum embeddings; combining sets of features with the cumulative sum embeddings, to produce respective supplemented cumulative-sum embeddings, the plural sets of features describing properties of the sections of roadway associated with the plural segments; mapping the supplemented cumulative-sum embeddings to segment embeddings using attention logic; and mapping the segment embeddings and a set of trip features to the ETA information.

(A10) According to some implementations of the method A9, the mapping of the plural segment embeddings includes mapping, using a feedforward neural network, the plural segment embeddings to respective estimates of time required to traverse the respective segments.

(A11) According to some implementations of the method A9 or A10, the mapping of the plural segment embeddings includes: combining the set of trip features with the segment embeddings, to produce supplemented segment embeddings; pooling the supplemented segment embeddings into a pooled embedding; and mapping, using a feedforward neural network, the pooled embedding to an estimate of a time-of-arrival for the trip as a whole, and distribution parameters associated with the two or more distributions.

(A12) According to some implementations of the method A11, the pooling is a global averaging pooling operation.

(A13) According to some implementations of any of the methods A1-A12, the one or more output devices include any combination of: a presentation device for presenting the ETA information; and/or a control device for controlling a vehicle based on the ETA information; and/or a dispatching device for dispatching departure instructions to a vehicle based on the ETA information.

(B1) According to a second aspect, a method (e.g., the process 602) is described for providing assistance in navigating over a geographic region. The method includes receiving a route between a starting location and an ending location, the starting location being a physical location at which a trip is to begin, and the ending location being a physical location at which the trip is to end (e.g., wherein the route may be produced in block 606). The route includes a sequence of segments, the segments being associated with respective sections of physical roadway infrastructure. The method also includes using (e.g., in block 608) a machine-trained model (e.g., the machine-trained model 106) to map information regarding the segments to estimated time-of-arrival (ETA) information, the ETA information including plural parts. The plural parts include an estimate of a time-of-arrival for the trip as a whole, and an estimate of parameters of two or more distributions that are used to model the time-of-arrival for the trip as a whole. The ETA information provides guidance in navigating between the starting location and the ending location via the route (as represented by block 610).

(C1) According to a third aspect, a method (e.g., the process 602) is described for providing assistance in navigating over a geographic region. The method includes receiving a route between a starting location and an ending location, the starting location being a physical location at which a trip is to begin, and the ending location being a physical location at which the trip is to end (e.g., wherein the route may be produced in block 606). The route includes a sequence of segments, the segments being associated with respective sections of physical roadway infrastructure. The method also includes using (e.g., in block 608) a machine-trained model (e.g., the machine-trained model 106) to map information regarding the segments to time-of-arrival (ETA) information, the machine-trained model being implemented as a neural network that is trained based on a loss function that models the ETA information using a mixture of two or more distributions. The ETA information provides guidance in navigating between the starting location and the ending location via the route (as represented by block 610).

In yet another aspect, some implementations of the technology described herein include a computing system (e.g., the computing system 1402) that includes a processing system (e.g., the processing system 1404) having a processor. The computing system also includes a storage device (e.g., the computer-readable storage media 1406) for storing computer-readable instructions (e.g., information 1408). The processing system executes the computer-readable instructions to perform any of the methods described herein (e.g., any individual method of the methods of A1-A13, B1, or C1).

In yet another aspect, some implementations of the technology described herein include a computer-readable storage medium (e.g., the computer-readable storage media 1406) for storing computer-readable instructions (e.g., the information 1408). A processing system (e.g., the processing system 1404) executes the computer-readable instructions to perform any of the operations described herein (e.g., the operation in any individual method of the methods of A1-A13, B1, or C1).

More generally stated, any of the individual elements and steps described herein are combinable into any logically consistent permutation or subset. Further, any such combination can be manifested as a method, device, system, computer-readable storage medium, data structure, article of manufacture, graphical user interface presentation, etc. The technology is also expressible as a series of means-plus-format elements in the claims, although this format should not be considered to be invoked unless the phrase "means for" is explicitly used in the claims.

As to terminology used in this description, the phrase "configured to" encompasses various physical and tangible mechanisms for performing an identified operation. The mechanisms are configurable to perform an operation using the hardware logic circuitry 1412 of FIG. 14. The term "logic" likewise encompasses various physical and tangible mechanisms for performing a task. For instance, each processing-related operation illustrated in the flowcharts of FIGS. 6 and 12 corresponds to a logic component for performing that operation.

This description may have identified one or more features as optional. This type of statement is not to be interpreted as an exhaustive indication of features that are to be considered optional; generally, any feature is to be considered as an example, although not explicitly identified in the text, unless otherwise noted. Further, any mention of a single entity is not intended to preclude the use of plural such entities; similarly, a description of plural entities in the specification is not intended to preclude the use of a single entity. As such, a statement that an apparatus or method has a feature X does not preclude the possibility that it has additional features. Further, any features described as alternative ways of carrying out identified functions or implementing identified mechanisms are also combinable together in any combination, unless otherwise noted.

In terms of specific terminology, the term "plurality" or "plural" or the plural form of any term (without explicit use of "plurality" or "plural") refers to two or more items, and does not necessarily imply "all" items of a particular kind, unless otherwise explicitly specified. The term "at least one of" refers to one or more items; reference to a single item, without explicit recitation of "at least one of" or the like, is not intended to preclude the inclusion of plural items, unless otherwise noted. Further, the descriptors "first," "second," "third," etc. are used to distinguish among different items, and do not imply an ordering among items, unless otherwise noted. The phrase "A and/or B" means A, or B, or A and B. The phrase "any combination thereof" refers to any combination of two or more elements in a list of elements. Further, the terms "comprising," "including," and "having" are open-ended terms that are used to identify at least one part of a larger whole, but not necessarily all parts of the whole. A "set" is a group that includes one or more members. The phrase "A corresponds to B" means "A is B" in some contexts. Finally, the terms "exemplary" or "illustrative" refer to one implementation among potentially many implementations.

In closing, the functionality described herein is capable of employing various mechanisms to ensure that any user data is handled in a manner that conforms to applicable laws, social norms, and the expectations and preferences of individual users. For example, the functionality is configurable to allow a user to expressly opt in to (and then expressly opt out of) the provisions of the functionality. The functionality is also configurable to provide suitable security mechanisms to ensure the privacy of the user data (such as data-sanitizing mechanisms, encryption mechanisms, and/or password-protection mechanisms).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for providing assistance in navigating over a geographic region, comprising:
    receiving a starting location, the starting location being a physical location at which a trip is to begin, and an ending location, the ending location being a physical location at which the trip is to end;
    using a computer-implemented route-finding technique to identify a route between the starting location and the ending location, the route including a sequence of segments, the segments being associated with respective sections of physical roadway infrastructure;
    generating plural cumulative-sum distances for the sequence of segments of the route output by the computer-implemented route-finding technique, each cumulative distance being a distance of a particular segment that is added to a sum of distances of segments that precede the particular segment;
    in a neural network having plural layers and having machine-trained weights, mapping the plural cumulative-sum distances to estimated time-of-arrival (ETA) information using attention analysis, wherein the ETA information includes an estimate of a time-of-arrival for the trip as a whole, and an estimate of parameters of two or more distributions that model the ETA information for the trip as a whole; and
    providing guidance in navigating between the starting location and the ending location via the route based on the ETA information,
    wherein the mapping includes:
    in an encoding layer of the neural network, encoding the plural cumulative-sum distances into respective cumulative-sum embeddings;
    in a combining layer of the neural network, combining sets of features with the cumulative-sum embeddings, to produce respective supplemented cumulative-sum embeddings, the sets of features describing properties of the sections of physical roadway infrastructure, associated with the segments;
    in an attention layer of the neural network, mapping the supplemented cumulative-sum embeddings to segment embeddings using the attention analysis, the attention layer computing a relevance that each supplemented cumulative-sum embedding has in an interpretation of each other supplemented cumulative-sum embedding; and
    in a post-attention layer of the neural network, mapping the segment embeddings and a set of trip features to the ETA information.

2. The method of claim 1, wherein the two or more distributions are two or more normal distributions.

3. The method of claim 1, wherein the two or more distributions are two or more lognormal distributions.

4. The method of claim 1, wherein the ETA information also includes an indication of how much time is required to traverse each segment.

5. The method of claim 1, wherein the parameters of the two or more distributions include means and standard deviations of the two or more distributions.

6. The method of claim 1, wherein the mapping of the segment embeddings includes mapping, using a feedforward neural network, the segment embeddings to respective estimates of time required to traverse the sequence of segments of the route.

7. The method of claim 1, wherein the mapping of the segment embeddings includes:
combining the set of trip features with the segment embeddings, to produce supplemented segment embeddings;
pooling the supplemented segment embeddings into a pooled embedding; and
mapping, using a feedforward neural network, the pooled embedding to the estimate of the time-of-arrival for the trip as a whole, and the parameters of the two or more distributions.

8. The method of claim 7, wherein the pooling is a global averaging pooling operation.

9. The method of claim 1, wherein the providing assistance comprises presenting the ETA information.

10. The method of claim 1, wherein the providing assistance comprises controlling speed and/or steering of a self-driving vehicle based on the ETA information.

11. The method of claim 1, wherein the providing assistance comprises dispatching departure instructions to a vehicle based on the ETA information.

12. The method of claim 1, wherein the neural network has been trained by:
providing training examples that describe trips that have been traversed and associated ground-truth information, the ground-truth information representing amounts of time required to traverse the trips;
using the neural network to generate predicted times-of-arrival for the trips as respective wholes;
using the neural network to generate predicted distribution parameters for the trips as respective wholes, each of the trips being modeled by a mixture of distributions;
generating first loss information based on a difference between the predicted times-of-arrival for the trips and the ground-truth information;
generating second loss information based on a difference between the predicted distribution parameters for the trips and the ground-truth information; and
updating the machine-trained weights of the neural network based on the first loss information and the second loss information.

13. The method of claim 1, wherein the providing assistance comprises adjusting an environmental condition of a target destination based on the ETA information.

14. The method of claim 1, wherein the ETA information that the neural network generates is a re-estimation of ETA information produced by the computer-implemented route-finding technique.

15. A computing system for providing assistance in navigating over a geographic region, comprising:
a store for storing computer-readable instructions;
one or more processors for executing the computer-readable instructions in the store, to perform operations including:
receiving a route between a starting location and an ending location, the starting location being a physical location at which a trip is to begin, and the ending location being a physical location at which the trip is to end,
the route including a sequence of segments, the segments being associated with respective sections of physical roadway infrastructure;
in a neural network having plural layers and having machine-trained weights, mapping information regarding the segments to estimated time-of-arrival (ETA) information using attention analysis, the ETA information including plural parts, the plural parts including an estimate of a time-of-arrival for the trip as a whole, and an estimate of parameters of two or more distributions that are used to model the time-of-arrival for the trip as a whole; and
providing guidance in navigating between the starting location and the ending location via the route using the ETA information,
wherein the mapping includes:
generating plural cumulative-sum distances for the sequence of segments of the route, each cumulative distance being a distance of a particular segment that is added to a sum of distances of segments that precede the particular segment;
in an encoding layer of the neural network, encoding the cumulative-sum distances into respective cumulative-sum embeddings;
in a combining layer of the neural network, combining sets of features with the cumulative-sum embeddings, to produce respective supplemented cumulative-sum embeddings, the sets of features describing properties of the segments;
in an attention layer of the neural network, mapping the supplemented cumulative-sum embeddings to segment embeddings using the attention analysis based on a query weighting matrix, a key weighting matrix, and a value weighting matrix, the attention layer computing a relevance that each supplemented cumulative-sum embedding has in an interpretation of each other supplemented cumulative-sum embedding; and
in a post-attention layer of the neural network, mapping the segment embeddings and a set of trip features to the ETA information.

16. The computing system of claim 15, wherein the neural network has been trained by:
providing training examples that describe trips that have been traversed and associated ground-truth information, the ground-truth information representing amounts of time required to traverse the trips;
using the neural network to generate predicted times-of-arrival for the trips as respective wholes;
using the neural network to generate predicted distribution parameters for the trips as respective wholes, each of the trips being modeled by a mixture of distributions;
generating first loss information based on a difference between the predicted times-of-arrival for the trips and the ground-truth information;
generating second loss information based on a difference between the predicted distribution parameters for the trips and the ground-truth information; and
updating the machine-trained weights of the neural network based on the first loss information and the second loss information.

17. The computing system of claim 15, wherein the mapping of the segment embeddings includes:

combining the set of trip features with the segment embeddings, to produce supplemented segment embeddings;

pooling the supplemented segment embeddings into a pooled embedding; and mapping, using a feedforward neural network, the pooled embedding to the estimate of the time-of-arrival for the trip as a whole, and the parameters of the two or more distributions.

18. A computer-readable storage medium for storing computer-readable instructions, one or more processors executing the computer-readable instructions to perform operations, the operations comprising:

receiving a route between a starting location and an ending location, the starting location being a physical location at which a trip is to begin, and the ending location being a physical location at which the trip is to end, the route including a sequence of segments, the segments being associated with respective sections of physical roadway infrastructure;

generating plural cumulative-sum distances for the sequence of segments of the route that is received, each cumulative distance being a distance of a particular segment that is added to a sum of distances of segments that precede the particular segment;

in a neural network having plural layers and having machine-trained weights, mapping the plural cumulative-sum distances to estimated time-of-arrival (ETA) information using attention analysis, wherein the ETA information includes an estimate of a time-of-arrival for the trip as a whole, and an estimate of parameters of two or more distributions that model the ETA information for the trip as a whole; and providing guidance in navigating between the starting location and the ending location via the route based on the ETA information, wherein the mapping includes:

in an encoding layer of the neural network, encoding the plural cumulative-sum distances into respective cumulative-sum embeddings;

in a combining layer of the neural network, combining sets of features with the cumulative-sum embeddings, to produce respective supplemented cumulative-sum embeddings, the sets of features describing properties of the sections of physical roadway infrastructure, associated with the segments;

in an attention layer of the neural network, mapping the supplemented cumulative-sum embeddings to segment embeddings using the attention analysis based on a query weighting matrix, a key weighting matrix, and a value weighting matrix, the attention layer computing a relevance that each supplemented cumulative-sum embedding has in an interpretation of each other supplemented cumulative-sum embedding and in a post-attention layer of the neural network, mapping the segment embeddings and a set of trip features to the ETA information.

19. The computer-readable storage medium of claim 18, wherein the neural network having been trained by:

providing training examples that describe trips that have been traversed and associated ground-truth information, the ground-truth information representing amounts of time required to traverse the trips;

using the neural network to generate predicted times-of-arrival for the trips as respective wholes;

using the neural network to generate predicted distribution parameters for the trips as respective wholes, each of the trips being modeled by a mixture of distributions;

generating first loss information based on a difference between the predicted times-of-arrival for the trips and the ground-truth information; and generating second loss information based on a difference between the predicted distribution parameters for the trips and the ground-truth information; and updating the machine-trained weights of the neural network based on the first loss information and the second loss information.

20. The computer-readable storage medium of claim 18, wherein the mapping of the segment embeddings includes:

combining the set of trip features with the segment embeddings, to produce supplemented segment embeddings;

pooling the supplemented segment embeddings into a pooled embedding; and mapping, using a feedforward neural network, the pooled embedding to the estimate of the time-of-arrival for the trip as a whole, and the parameters of the two or more distributions.

\* \* \* \* \*